United States Patent

Higashino et al.

(10) Patent No.: US 7,498,713 B2
(45) Date of Patent: Mar. 3, 2009

(54) DYNAMOELECTRIC STATOR AND METHOD FOR MANUFACTURING A DYNAMOELECTRIC STATOR

(75) Inventors: Kyoko Higashino, Tokyo (JP); Wakaki Miyaji, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 399 days.

(21) Appl. No.: 11/339,528

(22) Filed: Jan. 26, 2006

(65) Prior Publication Data

US 2007/0046136 A1  Mar. 1, 2007

(30) Foreign Application Priority Data

Aug. 25, 2005  (JP)  ............................. 2005-243910

(51) Int. Cl.
*H02K 3/38* (2006.01)
(52) U.S. Cl. ........................................ 310/260; 310/45

(58) Field of Classification Search .................. 310/43, 310/45, 260, 270
See application file for complete search history.

(56) References Cited

U.S. PATENT DOCUMENTS

| 5,034,643 | A * | 7/1991 | Trian ........................... 310/215 |
| 6,486,586 | B2 * | 11/2002 | Higashino et al. ........... 310/263 |
| 6,933,652 | B2 * | 8/2005 | Higashino et al. ........... 310/260 |
| 7,284,312 | B2 * | 10/2007 | Oohashi et al. ............... 29/596 |

FOREIGN PATENT DOCUMENTS

JP   52133501 A * 11/1977
JP   2004-194398 A   7/2004

* cited by examiner

*Primary Examiner*—Tran N Nguyen
(74) *Attorney, Agent, or Firm*—Sughrue Mion, PLLC

(57) ABSTRACT

A stator includes: an annular stator core in which a plurality of slots opening radially inward are formed circumferentially; and a stator winding installed in the stator core. A sheet-shaped varnish supporting member is disposed so as to be placed in close contact with a radially-outermost surface of a coil end group of the stator winding around an entire circumference, and a varnish is applied to the coil end group from radially inside.

4 Claims, 7 Drawing Sheets

DYNAMOELECTRIC STATOR AND METHOD FOR MANUFACTURING A DYNAMOELECTRIC STATOR

BACKGROUND OF THE INVENTION

1. Field of the Invention

The present invention relates to a dynamoelectric stator such as for an automotive alternator, etc., and a method for manufacturing a dynamoelectric stator, and particularly to a stator and a method for manufacturing a stator wherein adhesion of varnish to radially-outer first and second axial end portions of a stator core is suppressed.

2. Description of the Related Art

Conventional automotive alternator stators include: a cylindrical stator core in which slots opening radially inward are arranged at a predetermined pitch circumferentially; and a stator winding installed in the stator core, and are mounted such that radially-outer first and second axial end portions of the stator core are held from first and second axial ends by a front-end bracket and a rear-end bracket. (See Patent Literature 1, for example.) Annular varnish supporting members made of a glass-reinforced epoxy resin are mounted radially inside coil end groups of the stator winding, and varnish is dripped from radially outside the exposed coil end groups. Here, the varnish is prevented from leaking radially inside the coil end groups by the varnish supporting members. Thus, problems such as the rotor sticking to the stator core, etc., which arise as a result of the varnish leaking radially inside the coil end groups, are prevented.

In conventional methods for manufacturing stators, air is also blown toward outer peripheral portions of the coil end groups (radially outward) while dripping the varnish so as to prevent the varnish from adhering to first and second axial end portion surfaces of the stator core. (See Patent Literature 2, for example.)

Patent Literature 1: Japanese Patent Laid-Open No. 2004-187469 (Gazette)

Patent Literature 2: Japanese Patent Laid-Open No. 2004-194398 (Gazette)

In automotive alternators, only a slight gap is present between radially-inner surfaces of the stator and radially-outer surfaces of the rotor. Thus, when a varnish supporting member is disposed in a ring shape radially inside the coil end groups as in conventional automotive alternator stators, there has been a risk that a delay in the rotational action of the rotor may be caused if deformation or tearing occurs in the varnish supporting member. Furthermore, because the varnish is applied by being dripped from radially outside the coil end groups, the varnish also adheres easily to the radially-outer first and second axial end portions of the stator core, which constitute a stator supporting portion. Thus, there has been a risk that the stator supporting portion may lose its flatness if the varnish adheres to the radially-outer first and second axial end portions of the stator core, preventing the stator core from being held from the first and second axial ends by the front-end bracket and the rear-end bracket.

In conventional methods for manufacturing stators, because air is blown toward radially-outer sides of the coil end groups while the varnish is being dripped onto the coil end groups, varnish that has adhered to the first and second axial end surfaces of the stator core is blown off by the air, preventing the varnish from adhering to the radially-outer first and second axial end portions of the stator core. This varnish functions to fix conductor wires constituting the coil end groups to each other, and also enters the slots to fix the conductor wires inside the slots to the slots. However, because the air blows the varnish toward an outer periphery of the coil end groups, the varnish crosses the conductor wires of the coil ends and is less likely to enter the slots. As a result, another problem has been that the varnish must be dripped excessively, reducing varnish usage efficiency. Furthermore, because the varnish is blown off the coil end groups and adheres to the air nozzle and other equipment, yet another problem has been that maintenance is troublesome and expensive.

SUMMARY OF THE INVENTION

The present invention aims to solve the above problems and an object of the present invention is to provide a dynamoelectric stator that does not give rise to problems such as rubbing against a rotor, etc., even if a varnish supporting member is disposed, and in which varnish is unlikely to adhere to radially-outer first and second axial end portions of a stator core.

Another object of the present invention is to provide a method for manufacturing a dynamoelectric stator enabling varnish to be applied without reducing varnish usage efficiency and also without the varnish adhering to radially-outer first and second axial end portions of a stator core.

In order to achieve the above object, according to one aspect of the present invention, there is provided a dynamoelectric stator including: an annular stator core in which a plurality of slots opening radially inward are formed circumferentially; and a stator winding installed in the stator core, wherein: a sheet-shaped varnish supporting member is disposed so as to be placed in close contact with a radially-outermost surface of a coil end group of the stator winding around an entire circumference; a radially-innermost surface and an axial end surface of the coil end group are exposed around the entire circumference; and a varnish is applied to the coil end group.

According to another aspect of the present invention, there is provided a method for manufacturing a dynamoelectric stator in which a varnish is applied to a coil end group of a stator winding installed in an annular stator core, the method including steps of installing the stator winding in the stator core; disposing a sheet-shaped varnish supporting member so as to be placed in close contact with a radially-outermost surface of a coil end group of the stator winding around an entire circumference; and disposing the stator core such that a central axis of the stator core is horizontal, and rotating the stator core around the central axis while dripping a varnish onto the coil end group from radially inside.

According to the present invention, because the varnish supporting member is disposed in close contact with the radially-outermost surface of the coil end group, interference with a rotor will not occur and operational performance of the dynamoelectric machine will not be reduced even if the varnish supporting member deforms. Because the varnish is prevented by the varnish supporting member from leaking radially outward from the coil end group, the varnish flows along the coil ends and is led inside the slots, suppressing adhesion of the varnish to radially-outer axial end portions of the stator core.

Because the varnish supporting member is disposed in close contact with the radially-outermost surface of the coil end group, and then the stator core is disposed such that its central axis is horizontal and the varnish is dripped onto the coil end group from radially inside, the varnish flows along the coil ends into the slots without leaking radially outward from the coil end group, suppressing adhesion of the varnish to radially-outer axial end portions of the stator core. Because the stator core rotates around its central axis during dripping of the varnish, inflow of the varnish along the coil ends and into the slots is promoted.

DETAILED DESCRIPTION OF THE PREFERRED EMBODIMENT

A preferred embodiment of the present invention will now be explained with reference to the drawings.

Figure 1:
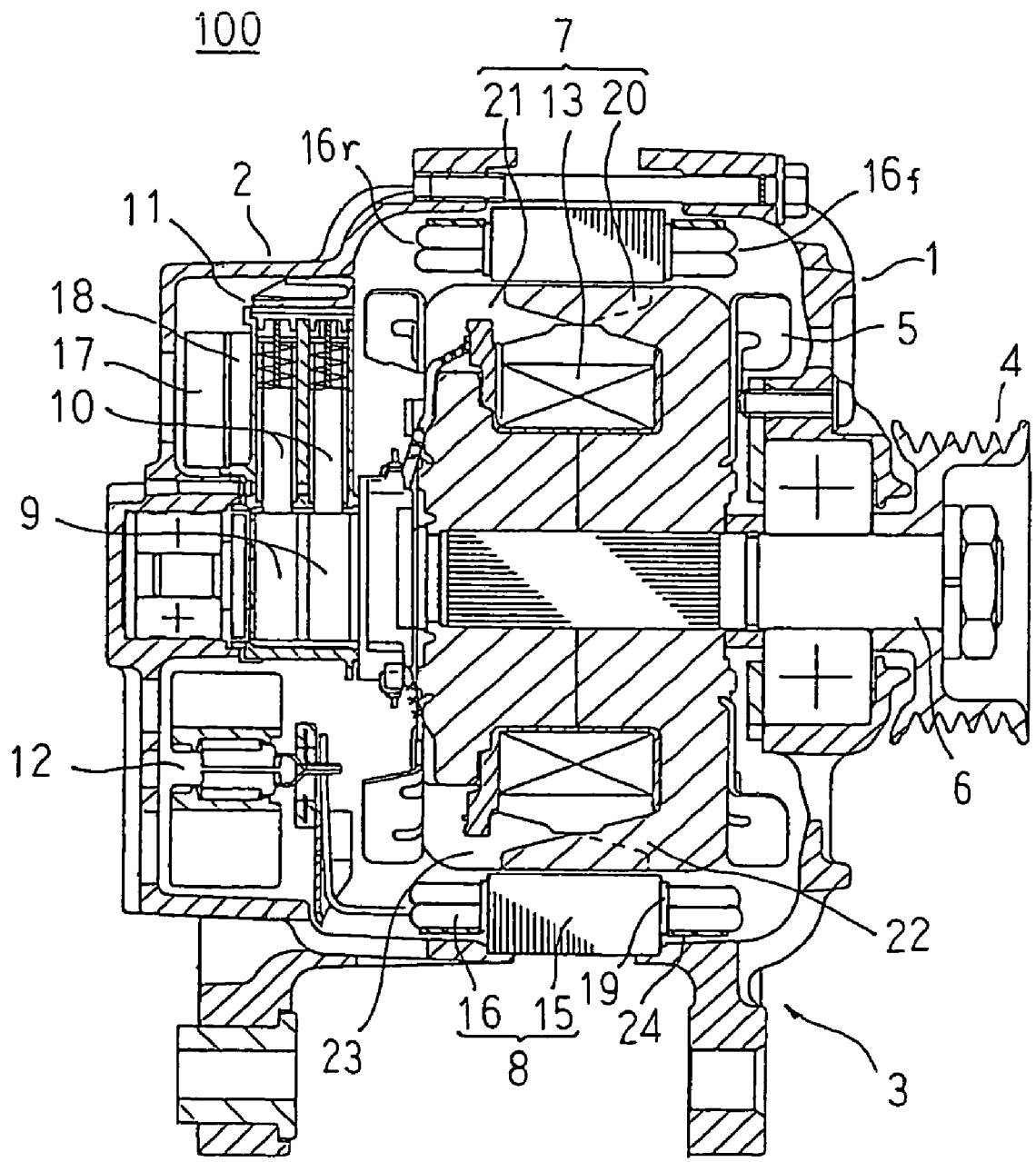
FIG. 1 is a longitudinal section showing an automotive alternator mounted with a stator according to a preferred embodiment of the present invention.

FIG. 1 is a longitudinal section showing an automotive alternator mounted with a stator according to a preferred embodiment of the present invention.

In FIG. 1, an automotive alternator 100 includes: a case 3 constituted by a front-end bracket 1 and a rear-end bracket 2 made of aluminum; a shaft 6 rotatably disposed in the case 3, a pulley 4 being fixed to a first end portion of the shaft 6; a rotor 7 fixed to the shaft 6 and disposed inside the case 3; fans 5 fixed to first and second axial end portions of the rotor 7; a stator 8 fixed to the case 3 so as to envelop the rotor 7; a pair of slip rings 9 fixed to a second end portion of the shaft 6 so as to supply electric current to the rotor 7; a pair of brushes 10 each sliding on a surface of the slip rings 9; a brush holder 11 for accommodating the brushes 10; a rectifier 12 electrically connected to the stator 8 so as to convert alternating current generated in the stator 8 into direct current; and a regulator 18 mounted to a heat sink 17 fitted onto the brush holder 11, the regulator 18 adjusting magnitude of alternating voltage generated in the stator 8.

The rotor 7 includes: a field winding 13 for generating magnetic flux on passage of electric current; and a pair of first and second pole cores 20 and 21 disposed so as to cover the field winding 13, magnetic poles being formed in the first and second pole cores 20 and 21 by the magnetic flux from the field winding. The first and second pole cores 20 and 21 are made of iron, having four first and four second claw-shaped magnetic poles 22 and 23, respectively, each of the claw-shaped magnetic poles 22 and 23 having a generally trapezoidal radially-outermost surface shape disposed on an outer peripheral edge portion at a uniform angular pitch in a circumferential direction so as to project axially, and the first and second pole cores 20 and 21 being fixed to the shaft 6 facing each other such that the first and second claw-shaped magnetic poles 22 and 23 intermesh.

Figure 2:
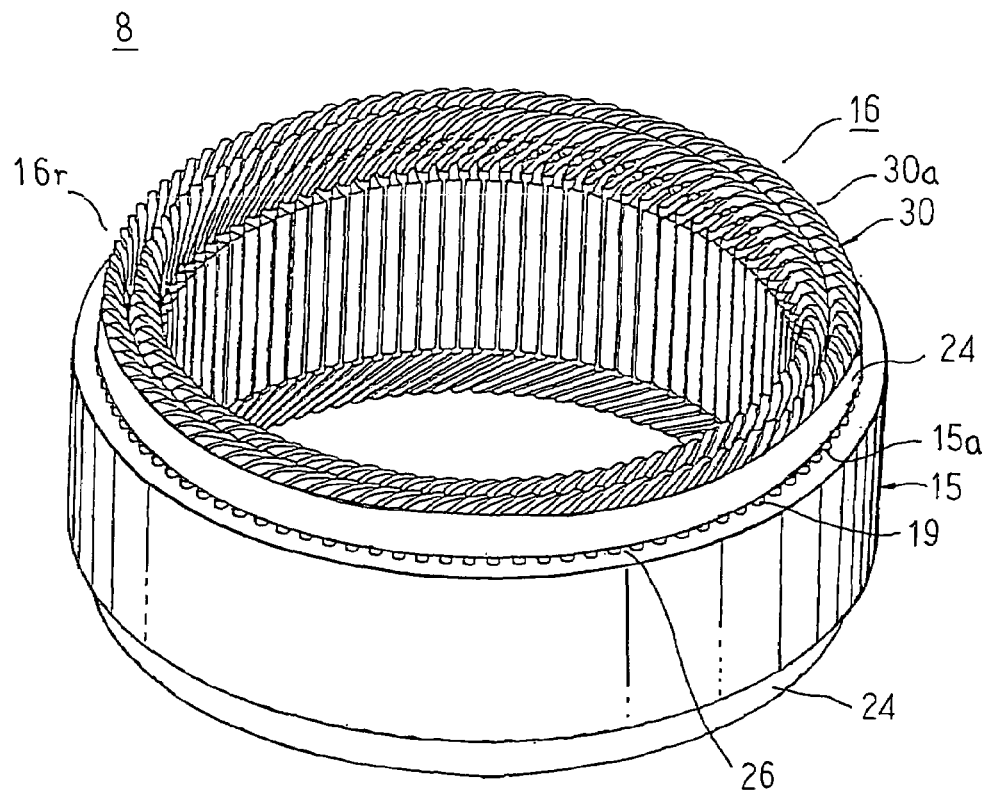
FIG. 2 is a perspective showing the stator according to the preferred embodiment of the present invention.
Figure 3:
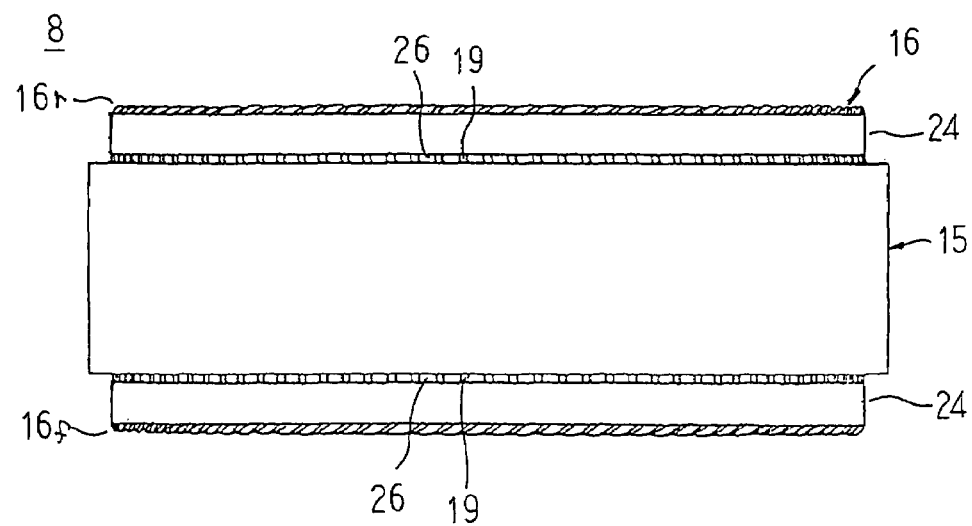
FIG. 3 is a side elevation showing the stator according to the preferred embodiment of the present invention.
Figure 4:
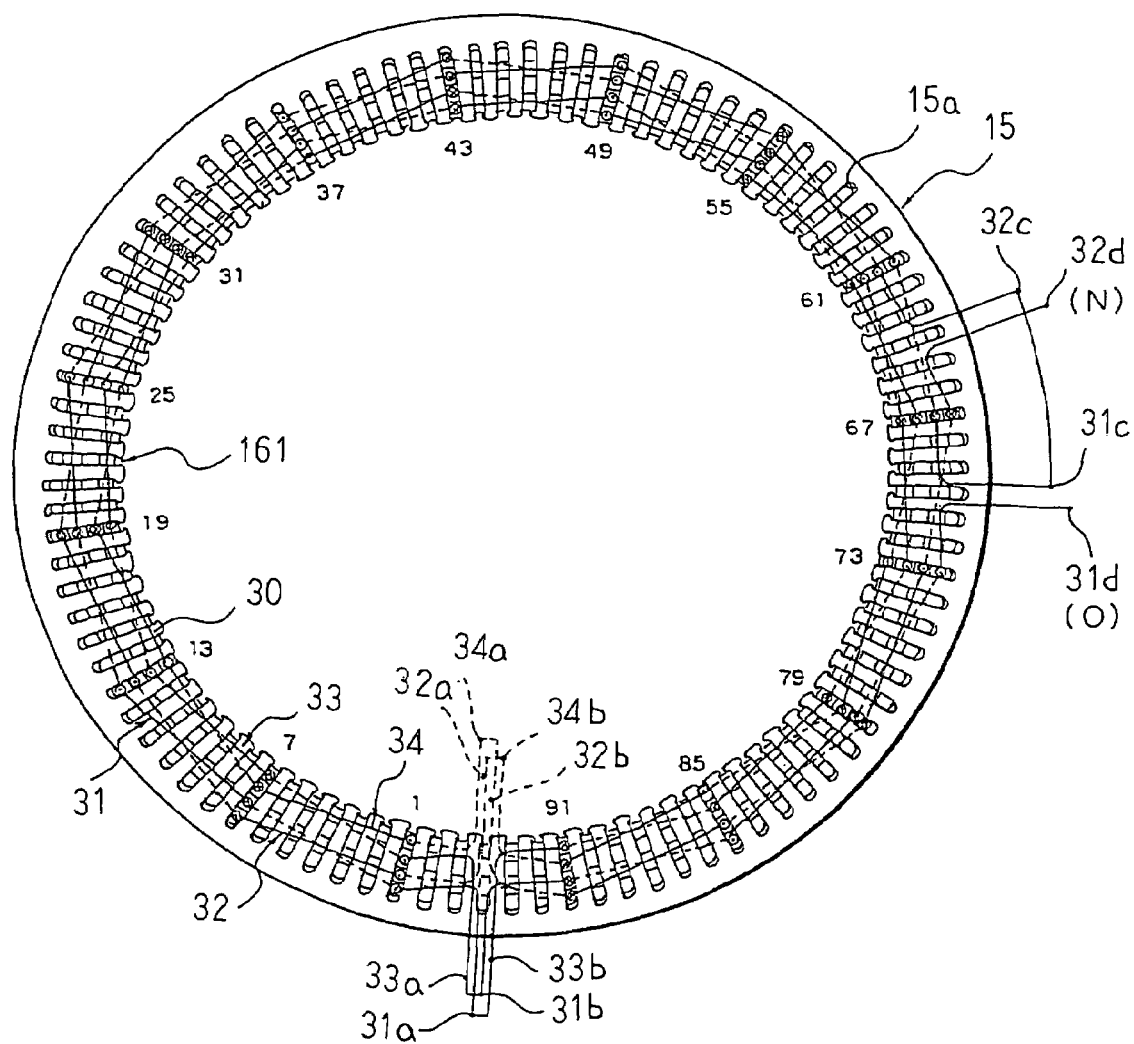
FIG. 4 is a rear-end end elevation schematically showing a first single-phase winding portion of a stator winding in the stator according to the preferred embodiment of the present invention.
Figure 5:
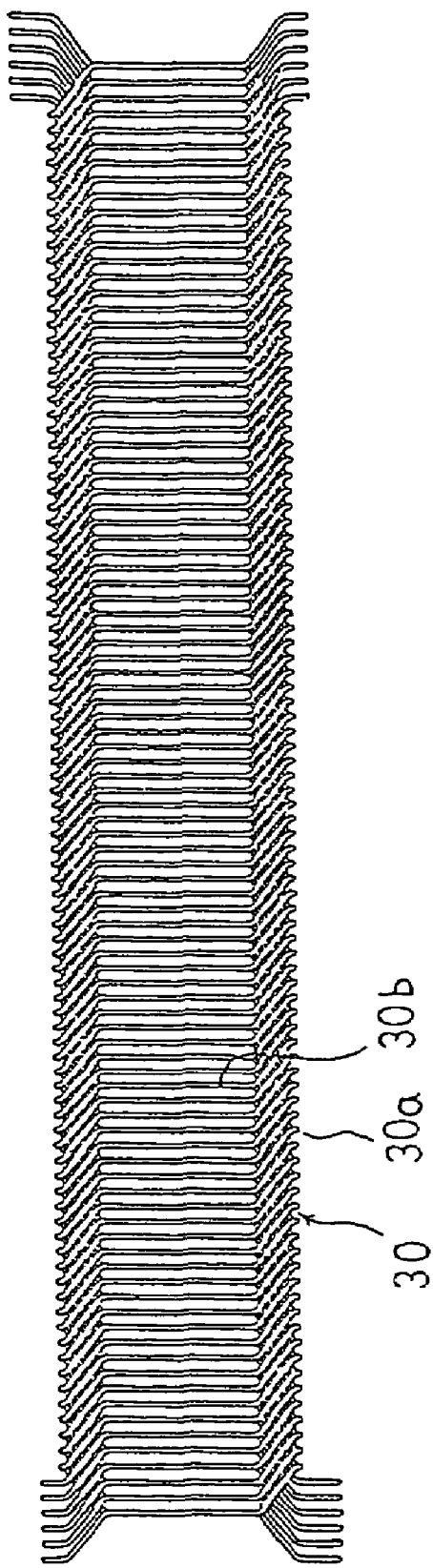
FIG. 5 is a diagram explaining a winding assembly constituting the stator winding of the stator according to the preferred embodiment of the present invention.
Figure 6:
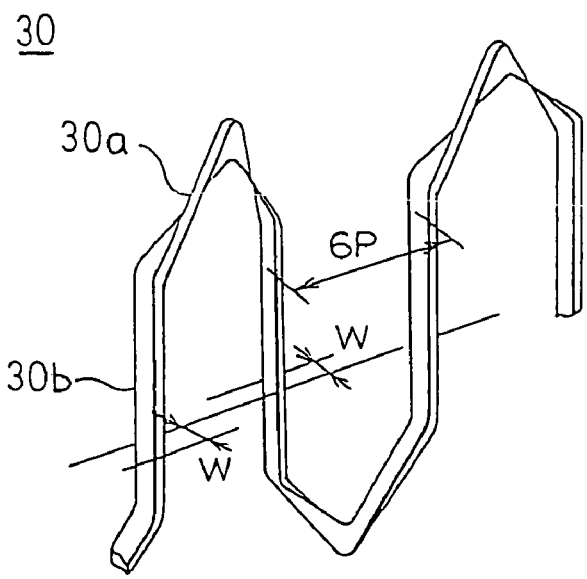
FIG. 6 is a perspective showing a conductor wire constituting the winding assembly shown in FIG. 5.
Figure 7:
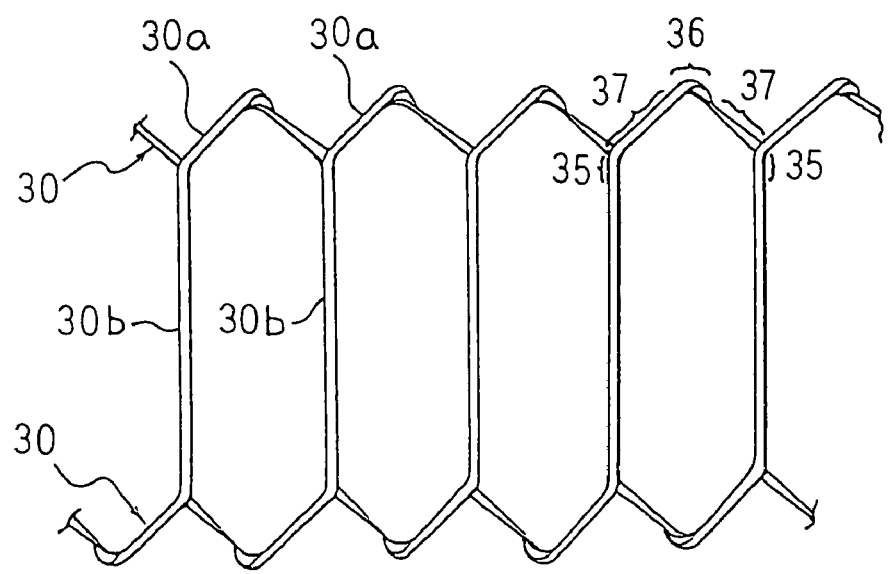
FIG. 7 is a perspective showing a pair of conductor wires constituting the winding assembly shown in FIG. 5.
Figure 8:
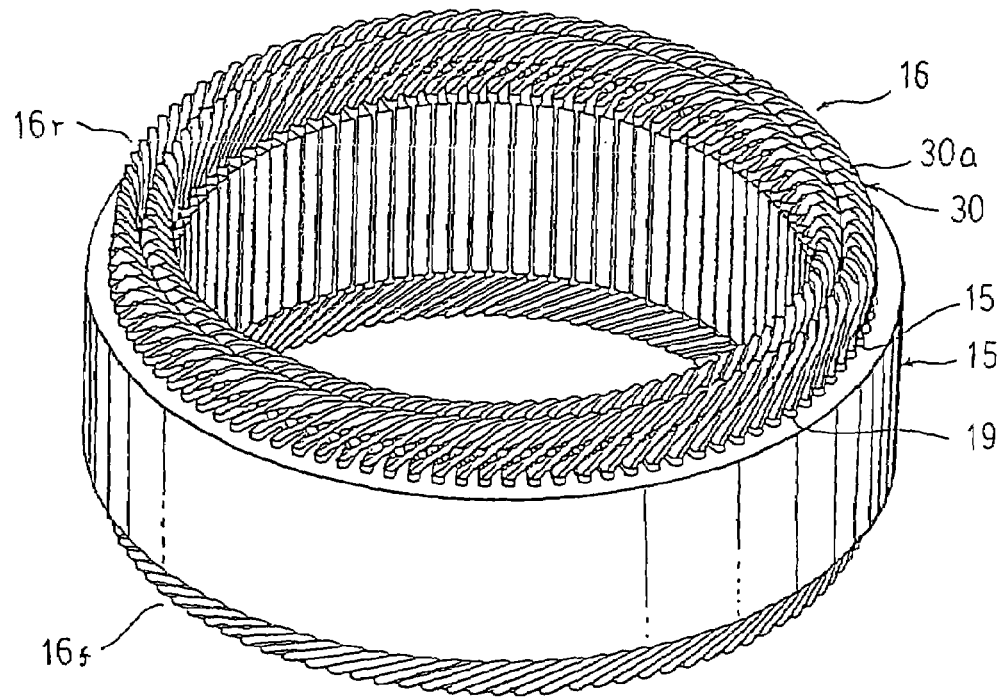
FIG. 8 is a perspective showing a state of a stator core according to the preferred embodiment of the present invention before varnish application.
Figure 9:
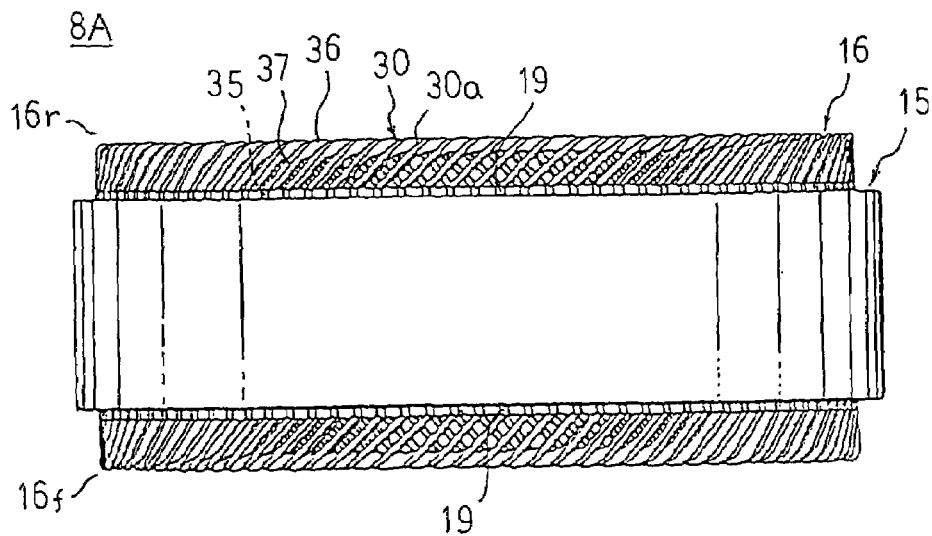
FIG. 9 is a side elevation showing the state of the stator core according to the preferred embodiment of the present invention before varnish application.
Figure 10:
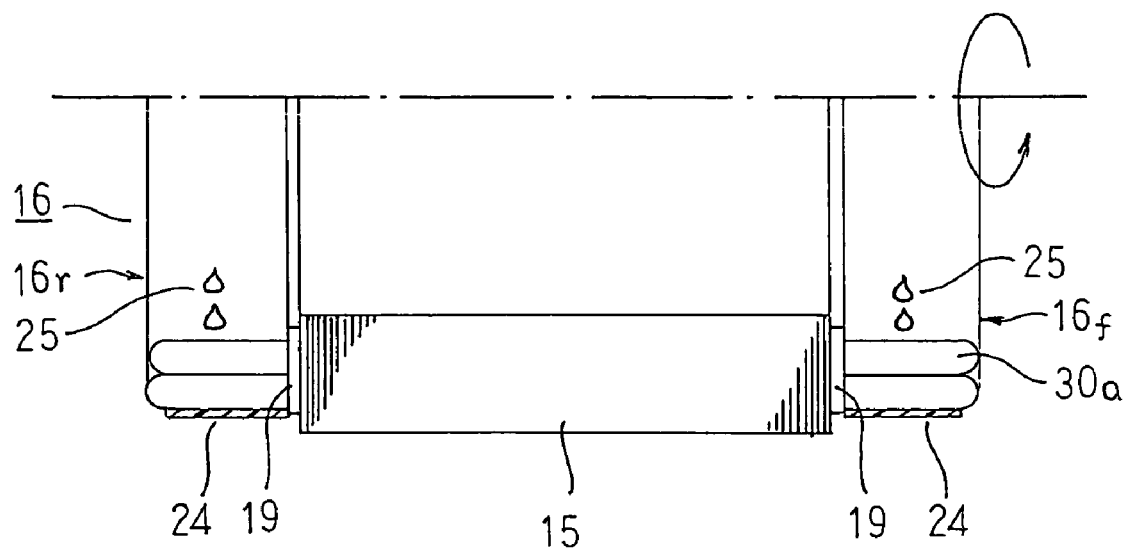
FIG. 10 is a diagram explaining a method for varnishing the stator core according to the preferred embodiment of the present invention.

Next, a specific configuration of the stator 8 will be explained with reference to FIGS. 2 through 10. Here, FIGS. 2 and 3 are a perspective and a side elevation, respectively, showing the stator according to the preferred embodiment of the present invention, FIG. 4 is a rear-end end elevation schematically showing a first single-phase winding portion of a stator winding in the stator according to the preferred embodiment of the present invention, FIG. 5 is a diagram explaining a winding assembly constituting the stator winding of the stator according to the preferred embodiment of the present invention, FIG. 6 is a perspective showing a conductor wire constituting the winding assembly shown in FIG. 5, FIG. 7 is a perspective showing a pair of conductor wires constituting the winding assembly shown in FIG. 5, FIGS. 8 and 9 are a perspective and a side elevation, respectively, showing a state of a stator core according to the preferred embodiment of the present invention before varnish application, and FIG. 10 is a diagram explaining a method for varnishing the stator core according to the preferred embodiment of the present invention. Moreover, in FIG. 4, solid lines indicate rear-end wiring, broken lines indicate front-end wiring, and black circles indicate joint portions.

The stator 8, as shown in FIGS. 2 and 3, is constituted by: a cylindrical stator core 15 composed of a laminated body of magnetic steel plates; and a stator winding 16 installed in the stator core 15.

Ninety-six (for example) slots 15a opening radially inward are formed in the stator core 15 circumferentially. In other words, the slots 15a are formed at a ratio of two slots per phase per pole. An insulator 19 is mounted inside each of the slots 15a so as to ensure electrical insulation between the stator core 15 and the stator winding 16. Each of the insulators 19 is mounted into a slot 15a so as to lie alongside an inner wall surface of the slot 15a and so as to project outward at first and second axial ends by a predetermined amount.

Varnish supporting members 24 in a sheet form constituted by a glass-reinforced epoxy resin, etc., are mounted so as to be placed in close contact with radially-outermost surfaces of front-end and rear-end coil end groups 16f and 16r of the stator winding 16 around entire circumferences of the front-end and rear-end coil end groups 16f and 16r. Axial end surfaces and radially-innermost surfaces of the front-end and rear-end coil end groups 16f and 16r are left exposed without varnish supporting members. In addition, a varnish 25 is applied to the front-end and rear-end coil end groups 16f and 16r from radially inside, as described below.

The stator 8 is mounted such that radially-outer first and second axial end portions of the stator core 15 are held under pressure by the front-end bracket 1 and the rear-end bracket 2, and a uniform air gap is formed between radially-outer surfaces of the first and second claw-shaped magnetic poles 22 and 23 and radially-inner surfaces of the stator core 15.

Next, construction of the stator winding 16 will be explained.

First, construction of a first single winding portion constituting the stator winding 16 will be explained with reference to FIG. 4. Here, housing positions for conductor wires 30 inside the slots 15a will be designated Address 1, Address 2, Address 3, and Address 4, respectively, from radially inside to facilitate explanation.

An a-phase winding portion 161 is constituted by first through fourth winding sub-portions 31 through 34 each formed by one conductor wire 30 functioning as a wire composed of a continuous copper wire having a rectangular cross section coated with an insulator. The first winding sub-portion 31 is configured by wave winding one conductor wire 30 so as to alternately occupy Address 4 and Address 3 in every sixth slot 15a from Slot Numbers 1 through 91. The second winding sub-portion 32 is configured by wave winding one conductor wire 30 so as to alternately occupy Address 3 and Address 4 in every sixth slot 15a from Slot Numbers 1 through 91. The third winding sub-portion 33 is configured by wave winding one conductor wire 30 so as to alternately occupy Address 2 and Address 1 in every sixth slot 15a from Slot Numbers 1 through 91. The fourth winding sub-portion 34 is configured by wave winding one conductor wire 30 so as to alternately occupy Address 1 and Address 2 in every sixth slot 15a from Slot Numbers 1 through 91. In each of the slots 15a, four conductor wires 30 are arranged so as to line up in one column radially with longitudinal axes of their rectangular cross sections aligned radially so as to be surrounded by an insulator 19.

At a rear end of the stator core 15, end portions of the first and third winding sub-portions 31 and 33 projecting out from Slot Number 91 and Slot Number 1 of the slots 15a are joined to each other using tungsten-arc inert gas-shielded (TIG) welding. Specifically, a two-turn wave winding is formed by joining together a first end portion 31a of the first winding sub-portion 31 and a second end portion 33b of the third winding sub-portion 33 and joining together a second end portion 31b of the first winding sub-portion 31 and a first end portion 33a of the third winding sub-portion 33.

At a front end of the stator core 15, end portions of the second and fourth winding sub-portion 32 and 34 projecting out from Slot Number 91 and Slot Number 1 of the slots 15a are joined to each other using TIG welding. Specifically, a two-turn wave winding is formed by joining together a first end portion 32a of the second winding sub-portion 32 and a second end portion 34b of the fourth winding sub-portion 34 and joining together a second end portion 32b of the second winding sub-portion 32 and a first end portion 34a of the fourth winding sub-portion 34.

Next, a portion of the conductor wire 30 of the second winding sub-portion 32 projecting outward at the rear end from Slot Number 61 and Slot Number 67 of the slots 15a is cut, and a portion of the conductor wire 30 of the first winding sub-portion 31 projecting outward from Slot Number 67 and Slot Number 73 of the slots 15a is cut. Then, a first cut end 32c of the second winding sub-portion 32 projecting outward from Address 3 of Slot Number 61 of the slots 15a, and a first cut end 31c of the first winding sub-portion 31 projecting outward from Address 3 of Slot Number 67 of the slots 15a are joined together by TIG welding. Thus, a four-turn wave winding (the a-phase winding portion 161) is formed in which the first through fourth winding sub-portions 31 through 34 are connected in series. A second cut end 32d of the second winding sub-portion 32 projecting outward from Address 4 of Slot Number 67 of the slots 15a and a second cut end 31d of the first winding sub-portion 31 projecting outward from Address 4 of Slot Number 73 of the slots 15a become first and second end portions of the a-phase winding portion 161. For example, the second cut end 31d of the first winding sub-portion 31 becomes an output wire (O) of the a-phase winding portion 161, and the second cut end 32d of the second winding sub-portion 32 becomes a neutral point (N) of the a-phase winding portion 161.

Although not shown, a d-phase winding portion, a c-phase winding portion, an f-phase winding portion, a b-phase winding portion, and an e-phase winding portion are formed in a similar manner such that the slot groups into which the conductor wires 30 of each winding portion are installed are successively offset by one slot from each other. The a-phase winding portion 161 is installed in a first slot group including Slot Numbers 1, 7, etc., through 91, the d-phase winding portion is installed in a second slot group including Slot Numbers 2, 8, etc., through 92, the c-phase winding portion is installed in a third slot group including Slot Numbers 3, 9, etc., through 93, the f-phase winding portion is installed in a fourth slot group including Slot Numbers 4, 10, etc., through 94, the b-phase winding portion is installed in a fifth slot group including Slot Numbers 5, 11, etc., through 95, and the e-phase winding portion is installed in a sixth slot group including Slot Numbers 6, 12, etc., through 96.

Here, a stator winding 16 constituted by two three-phase alternating-current windings can be configured if a first Y connection is formed by connecting neutral points (N) of the a-phase winding portion, the b-phase winding portion, and the c-phase winding portion and a second Y connection is formed by connecting neutral points (N) of the d-phase winding portion, the e-phase winding portion, and the f-phase winding portion.

A stator winding 16 constituted by a single three-phase alternating-current winding can also be configured if the a-phase winding portion and the d-phase winding portion are connected in series, the b-phase winding portion and the e-phase winding portion are connected in series, the c-phase winding portion and the f-phase winding portion are connected in series, and the three series-connected windings are formed into a Y connection.

Moreover, three winding portions of a three-phase alternating-current winding may also be delta-connected instead of Y-connected.

The stator winding 16 can be constructed using a winding assembly 40 such as that shown in FIG. 5.

The winding assembly 40 is prepared by simultaneously folding twelve conductor wires 30 arranged parallel to each other at a pitch of one slot into a lightning shape on a common plane.

As shown in FIG. 6, the conductor wires 30 folded into a lightning shape are shaped by bending into a planar pattern in which straight slot-housed portions 30b joined by coil ends 30a are arranged at a pitch of six slots (6P). Adjacent pairs of the slot-housed portions 30b are offset by the coil ends 30a by a width (w) of the conductor wires 30.

Six pairs of conductor wires 30 in each of which two of the conductor wires 30 shaped by bending in this manner are offset by a pitch of six slots with slot-housed portions 30b stacked as shown in FIG. 7 are arranged so as to be offset by a pitch of one slot from each other to constitute the winding assembly 40.

Winding assemblies 40 configured in this manner are stacked in two layers and mounted to a stator core 15 having insulators 19 disposed in each of the slots 15a. Thus, each of the conductor wires 30 is installed so as to alternately occupy an inner layer and an outer layer in a slot depth direction in the slots 15a in every sixth slot, constituting the first through fourth winding sub-portions 31 through 34 in FIG. 4. The a-phase winding portion 161, the b-phase winding portion, the c-phase winding portion, the d-phase winding portion, the e-phase winding portion, and the f-phase winding portion each composed of a four-turn wave winding in which the first through fourth winding sub-portions 31 through 34 are connected in series are configured by making connections based on the connection method shown in FIG. 4. Thus, as shown in FIGS. 8 and 9, a stator 8A is obtained in which the stator winding 16 is mounted to the stator core 15.

Each of the coil ends 30a is shaped so as to project outward axially from a slot 15a, subsequently extend circumferentially at an incline, then be turned around radially inward (or outward), next extend circumferentially at an incline, and be inserted axially into a slot 15a six slots away. In other words, the coil ends 30a are constituted by: a pair of root portions 35 projecting axially outward from the slots 15a; a return portion 36 turning around radially inward (or outward); and a pair of inclined portions 37 linking the pair of root portions 35 and the return portion 36. The insulators 19 mounted in the slots 15a project outward from the first and second axial end surfaces of the stator core 15 by approximately 2 mm each so as to cover the root portions 35 of the coil ends 30a.

In addition, at the rear end of the stator core 15, the coil ends 30a are arranged neatly at a pitch of one slot in a circumferential direction so as to form two rows, constituting the rear-end coil end group 16r. At the front end of the stator core 15, the coil ends 30a are arranged neatly at a pitch of one slot in a circumferential direction so as to form two rows, constituting the front-end coil end group 16f.

Next, sheet-shaped varnish supporting members 24 are mounted so as to be placed in close contact with radially-outermost surfaces of the front and rear coil end groups 16f and 16r of the stator winding 16 around an entire circumference of the front and rear coil end groups 16f and 16r. Here, the varnish supporting members 24 are disposed so as to cover the inclined portions 37 of the coil ends 30a. In other words, first edges of the varnish supporting members 24 are level with the ends of the insulators 19 projecting from the slots 15a relative to the axial direction of the stator core 15.

Then, the stator core 15 is held such that its central axis is horizontal using a stator holding mechanism (not shown), and as shown in FIG. 10, the stator core 15 is rotated around its central axis while a varnish 25 is dripped onto the front-end and rear-end coil end groups 16f and 16r from radially inside the stator winding 16.

The varnish 25 dripped onto the front-end and rear-end coil end groups 16f and 16r passes over the coil ends 30a and penetrates inside the front-end and rear-end coil end groups 16f and 16r. If the varnish 25 passes over the coil ends 30a and reaches the root portions 35, it is guided by the insulators 19 and penetrates inside the slots 15a. Here, because the stator core 15 is being rotated around its central axis, the varnish 25 will not pass between the root portions 35 of the coil ends 30a and flow radially outside the stator core 15. Thus, the varnish 25 is less likely to adhere to the first and second axial end surfaces of the stator core 15, and in particular, will not adhere radially outside the first and second axial end surfaces of the stator core 15.

Then, when the application of the varnish 25 is completed, the varnish 25 is heat-hardened to obtain the stator 8 shown in FIGS. 2 and 3.

Thus, because the varnish 25 does not adhere radially outside the first and second axial end surfaces of the stator core 15, the stator 8 can be mounted with the radially-outer first and second axial end portions (core supporting portions) of the stator core 15 placed in close contact with the front-end bracket 1 and the rear-end bracket 2. Thus, supporting strength for the stator 8 is ensured even if the automotive alternator 100 mounted with the stator 8 is subjected to vibrations from the engine, enabling mounting of the stator 8 that is stable for a long time to be achieved.

Because the insulators 19 project outward from the slots 15a so as to cover the root portions 35 of the coil ends 30a, electrically-insulating properties can also be prevented preemptively from deteriorating due to the conductor wires 30 rubbing against opening edges at the first and second axial ends of the slots 15a, etc.

Because the varnish supporting members 24 are disposed so as to be adjacent to the ends of the insulators 19 projecting from the slots 15a, varnish 25 that has flowed along the coil ends 30a to the root portions 35 during the process of applying the varnish 25 is guided to the insulators 19 and led inside the slots 15a without leaking radially outward from between the varnish supporting members 24 and the insulators 19. Thus, a sufficient amount of the varnish 25 can made to penetrate inside the slots 15a without having to apply the varnish 25 excessively.

The stator winding 16 is constituted by first through fourth winding sub-portions 31 through 34 in which conductor wires 30 are installed so as to be turned around alternately outside the slots at the first axial end surface of the stator core 15 and outside the slots at the second axial end surface and alternately occupy an inner layer and an outer layer in a slot depth direction in the slots 15a in every sixth slot. Coil ends 30a are arranged neatly at a pitch of one slot in a circumferential direction so as to form two rows, constituting front-end and rear-end coil end groups 16f and 16r. Thus, because radially-outermost surfaces of the front-end and rear-end coil end groups 16f and 16r form smooth cylindrical surfaces having no irregularities, the varnish supporting members 24 can be disposed so as to be placed uniformly in close contact with the radially-outermost surfaces of front-end and rear-end coil end groups 16f and 16r, thereby also suppressing the occurrence of peeling.

Cooling airflow passages 26 are formed so as to be aligned radially between the root portions 35 of circumferentially-adjacent coil ends 30a so as to extend along the axial end surfaces of the stator core 15 from radially-inner edges to radially-outer edges. Thus, while the automotive alternator 100 is operating, cooling airflows blown onto the front-end and rear-end coil end groups 16f and 16r from radially inside by the fans 5 being driven so as to rotate pass through the cooling airflow passages 26, cool internal portions of the front-end and rear-end coil end groups 16f and 16r, and are discharged radially outward, enabling the front-end and rear-end coil end groups 16f and 16r to be cooled effectively.

The varnish supporting members 24 are only disposed radially outside the front-end and rear-end coil end groups 16f and 16r. Thus, radially-inner surfaces of the front-end and rear-end coil end groups 16f and 16r are exposed to the cooling airflows blown onto the front-end and rear-end coil end groups 16f and 16r from radially inside by the fans 5 being driven so as to rotate, enabling the front-end and rear-end coil end groups 16f and 16r to be cooled effectively. Furthermore, even if the varnish supporting members 24 do happen to deform or burr, even though they may interfere with the case 3 on a fixed side, operational performance of the dynamoelectric machine will not be reduced because they will not interfere with the rotor 7 on a moving side.

The varnish supporting members 24 are disposed so as to be placed in close contact with the radially-outermost surfaces of the front-end and rear-end coil end groups 16f and 16r around the entire circumference, then the stator core 15 is disposed such that its central axis is horizontal, and the stator core 15 is rotated around its central axis while dripping the varnish 25 from radially inside the front-end and rear-end coil end groups 16f and 16r. Thus, because the varnish 25 is prevented from leaking radially outward through the front-end and rear-end coil end groups 16f and 16r by the varnish supporting members 24, conventional problems such as varnish 25 being blown from the front-end and rear-end coil end groups 16f and 16r, adhering to other equipment, and making maintenance troublesome and expensive, etc., are also solved, and adhesion of varnish 25 to the first and second axial end surfaces radially outside the stator core 15 is suppressed. Because the varnish 25 flows along the coil ends 30a and is led inside the slots 15a, a sufficient amount of the varnish 25 can be made to penetrate inside the slots 15a without having to apply the varnish 25 excessively. In addition, because varnish dripping nozzles (not shown) can be disposed radially inside the front-end and rear-end coil end groups 16f and 16r, size reductions in the manufacturing apparatus are made possible and manufacturing efficiency is improved compared to when varnish dripping nozzles are disposed radially outside the front-end and rear-end coil end groups 16f and 16r.

Moreover, in the above embodiment, an explanation is given for an automotive alternator, but similar effects are also exhibited if the present invention is applied to other dynamoelectric machines such as alternating-current motors, alternating-current electric motor-generators, etc.

In the above embodiment, the coil ends 30a are arranged at a pitch of one slot circumferentially so as to form two rows radially, but the number of radial rows of coil ends 30a is not limited to two rows, and may also be one row or three or more rows. For example, if winding assemblies 40 are mounted to the stator core 15 so as to be stacked in three layers, the front-end and rear-end coil end groups 16f and 16r will be constituted by coil ends 30a arranged at a pitch of one slot circumferentially so as to form three rows.

If there are a plurality of rows of coil ends 30a radially, heights of the coil ends 30a (heights from the axial end surfaces of the stator core 15 to apex portions of the return portions 36) may also be increased in radially-inner coil ends 30a. In that case, external shapes of the front-end and rear-end coil end groups 16f and 16r will be shapes parallel to internal shapes of the cup-shaped front-end bracket 1 and the rear-end bracket 2, suppressing interference between the stator winding 16 and the case 3 and enabling the stator 8 to be mounted to the case 3 without force.

In the above embodiment, first edges of the varnish supporting members 24 are disposed level with the ends of the insulators 19 projecting from the slots 15a relative to the axial direction of the stator core 15, but the first edges of the varnish supporting members 24 need only be disposed adjacent to the ends of the insulators 19 projecting outward from the slots 15a. In other words, the first edges of the varnish supporting members 24 may also be disposed slightly higher than the ends of the insulators 19 projecting outward from the slots 15a relative to the axial direction of the stator core 15. In that case, it is necessary to set gaps between the first edges of the varnish supporting members 24 and the ends of the insulators 19 projecting from the slots 15a such that the varnish 25 that has flowed along the coil ends 30a flows inside the insulators 19 from the gaps between the varnish supporting members 24 and the insulators 19 without leaking radially outward. The varnish supporting members 24 may be also disposed so as to overlap with the ends of the insulators 19 projecting from the slots 15a relative to the axial direction of the stator core 15. In that case, it is necessary to set the amount of overlap between the first edges of the varnish supporting members 24 and the ends of the insulators 19 projecting from the slots 15a such that cooling airflow passages 26 are ensured.

During the varnish application process for the stator core 15, it is acceptable to grip radially-inner surfaces of the stator core 15 in order to rotate the stator core 15, and it is also acceptable to grip radially-outer surfaces of the stator core 15 to rotate the stator core 15. If radially-outer surfaces of the stator core 15 are gripped, then the degree of freedom for the varnish dripping nozzles dripping the varnish 25 from radially inside the stator core 15 is increased and they become easier to control.

In the above embodiment, the first and second axial end surfaces of the stator core 15 are formed so as to have flat surfaces perpendicular to an axial direction, but the radially-outer sides of the first and second axial end portions of the stator core 15 may also be cut away to form small diameter portions, and the stator core 15 can be held under pressure by the front-end bracket 1 and the rear-end bracket 2 by making use of the stepped portions.

In the above embodiment, conductor wires 30 constituted by continuous copper wires are used for the wires of the stator winding 16, but U-shaped conductor segments may also be used instead of the conductor wires. In that case, because coil end groups can also be configured such that coil ends are arranged neatly at a pitch of one slot circumferentially to form two rows, the varnish supporting members 24 can be disposed in close contact with the radially-outermost surfaces of the coil end groups, enabling similar effects to be achieved.

In the above embodiment, conductor wires 30 having a rectangular cross section are used for the wires, but the cross-sectional shape of the conductor wires is not limited to a rectangular cross section, and may also be a circular cross section. Furthermore, conductor wires having a circular cross section having only slot-housed portions shaped with a rectangular cross section may also be used for the wires.

What is claimed is:

1. A dynamoelectric stator comprising:
    an annular stator core in which a plurality of slots opening radially inward are formed circumferentially; and
    a stator winding installed in said stator core,
    wherein:
    a sheet-shaped varnish supporting member is disposed so as to be placed in close contact with a radially-outermost surface of a coil end group of said stator winding around an entire circumference;
    a radially-innermost surface and an axial end surface of said coil end group are exposed around said entire circumference;
    a varnish is applied to said coil end group;
    an insulator is mounted in each of said slots so as to be interposed between a slot-housed portion of a wire constituting said stator winding and an inner wall surface of said slot and so as to project outward from said slot and cover a root portion of a coil end of said wire; and
    said varnish supporting member is disposed so as to be adjacent to an end of said insulator projecting from said slot relative to an axial direction of said stator core.

2. The dynamoelectric stator according to Claim 1, wherein:
    a cooling airflow passage is formed between circumferentially-adjacent portions of said insulators projecting from said slots so as to extend across an axial end surface of said stator core from a radially-inner edge to a radially-outer edge.

3. The dynamoelectric stator according to Claim 1, wherein:
    said wire is a continuous conductor wire;
    said stator winding has a plurality of windings in which said continuous conductor wire is installed so as to be turned around alternately outside said slots at a first axial end surface of said stator core and outside said slots at a second axial end surface and alternately occupy an inner layer and an outer layer in a slot depth direction in said slots at intervals of a predetermined number of slots; and
    coil ends formed by said continuous conductor wire being turned around outside said slots are arranged neatly circumferentially to constitute said coil end group.

4. The dynamoelectric stator according to Claim 3, wherein:
    a cooling airflow passage is formed between circumferentially-adjacent portions of said insulators projecting from said slots so as to extend across an axial end surface of said stator core from a radially-inner edge to a radially-outer edge.

* * * * *